March 30, 1926.  1,578,883
M. A. ESTES
VEHICLE PROPELLING MEANS
Filed Sept. 15, 1924   2 Sheets-Sheet 1

Inventor
M. A. Estes
By L. B. James
Attorney

March 30, 1926. 1,578,883
M. A. ESTES
VEHICLE PROPELLING MEANS
Filed Sept. 15, 1924 2 Sheets-Sheet 2
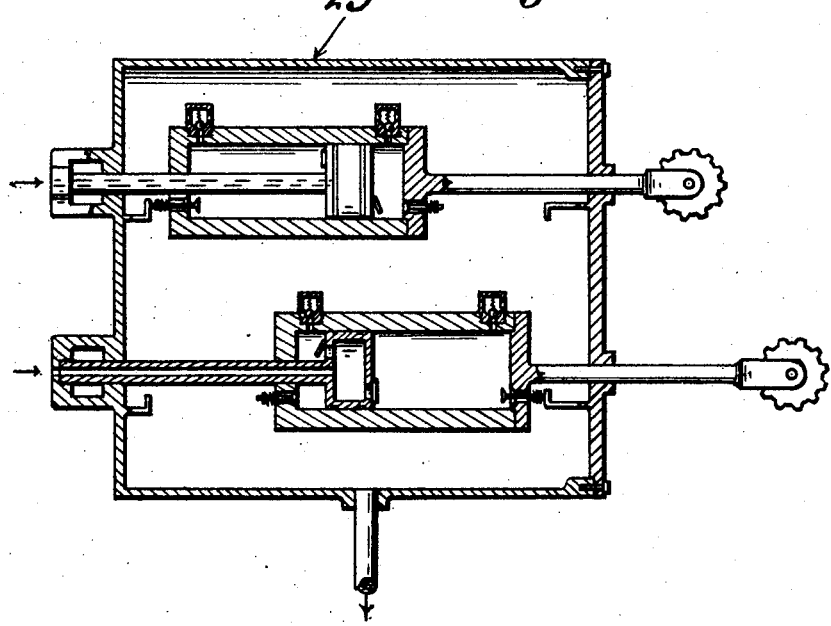
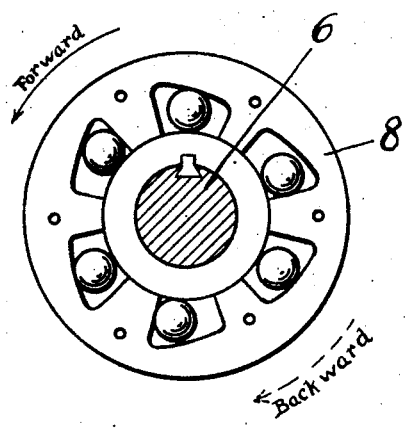
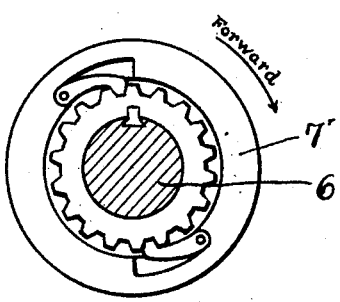
Inventor
M. A. Estes
By L. B. James
Attorney Patented Mar. 30, 1926.

1,578,883

UNITED STATES PATENT OFFICE.

MARSHALL A. ESTES, OF ESTES, VIRGINIA.

VEHICLE PROPELLING MEANS.

Application filed September 15, 1924. Serial No. 737,769.

*To all whom it may concern:*

Be it known that I, MARSHALL A. ESTES, a citizen of the United States, residing at State of Virginia, have invented new and useful Improvements in Vehicle Propelling ful Improvements in Vehicle Propelling Means, of which the following is a specification.

This invention relates to vehicles and more particularly to a motor propelled vehicle.

The primary object of this invention resides in the provision of a vehicle having a motor capable of delivering the maximum power to the driving wheels of the vehicle with the minimum consumption of fuel.

Another object of this invention resides in the provision of a vehicle having a motor that can be operated with either gaseous fuel or air under pressure.

Another object of this invention resides in the provision of a vehicle having a motor so connected to the driving wheels of the vehicle that even traction will be obtained when traversing sound roads and the full power of the motor delivered to either drive wheel should the other slip or skid.

A still further object of this invention resides in the provision of a vehicle having a motor capable of driving the vehicle either forwardly or backwardly and yet permit the vehicle to be stopped without interfering with the operation of the motor.

In addition to the foregoing objects, this invention resides in the provision of a power driven vehicle consisting of an assemblage of cooperating elements adapted to prevent the vehicle from moving backward should it be stopped on a grade.

Besides the aforesaid objects, this invention includes a motor of particular construction whose operation is dependent on the particular manner of connecting certain auxiliaries thereof to the driving axles of a vehicle.

With these and other objects in view, this invention resides in certain novel features of construction, arrangement and combination of elements to be hereinafter set forth in the specification, illustrated in the accompanying drawings and pointed out in the appended claims and, while the disclosure depicts my present conception of the invention, the right is reserved to make such changes as come within the scope of the claims.

In the accompanying drawings forming a part of this application:

Fig. 3 is an enlarged detailed view of the motor.

Fig. 4 is an enlarged sectional view of the driving axles of the vehicle.

Fig. 5 is a detail sectional view of one of the driving wheel clutches.

Figure 1:
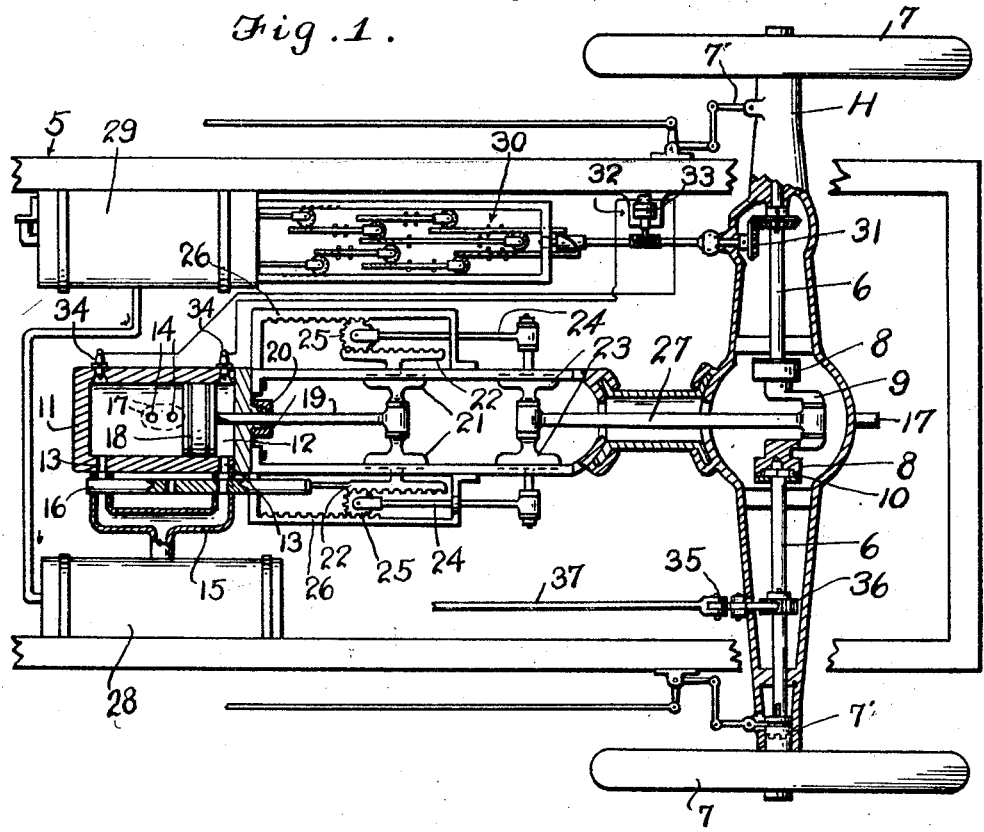
Fig. 1 is a plan view of the chassis of a vehicle showing the elements of this invention in operative relation thereon.
Figure 2:
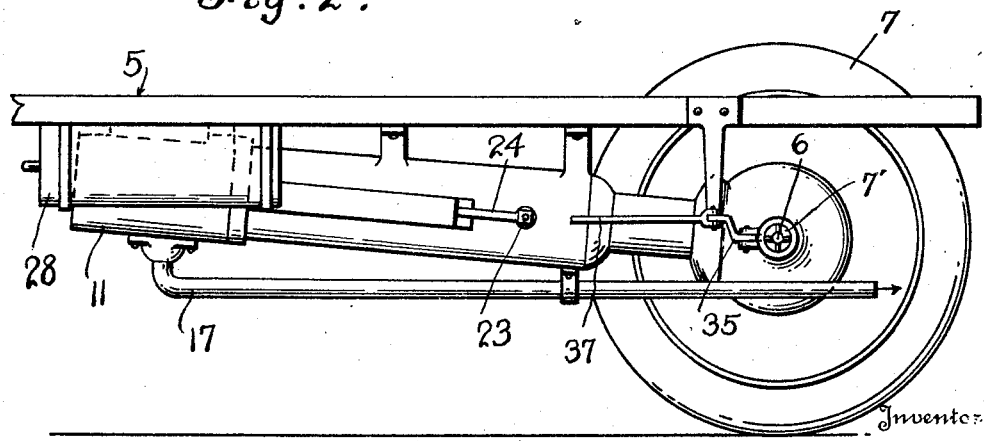
Fig. 2 is a side view of the same.

In the present embodiment of this invention, the numeral 5 designates the chassis of a vehicle, preferably an automobile, and, among other necessary auxiliaries thereto, includes driving axles 6 having drive wheels 7 connected to their outer ends by manually controlled clutches 7'.

The inner opposed ends of the axles are connected to sleeves 8, formed on a crank 9, through the instrumentality of cam clutches 10 capable of actuation in either clockwise or anti-clockwise direction to permit the vehicle to move forward or backward at the will of the operator.

The motor of this particular type of vehicle consists of a cylinder 11 having combustion chambers 12 at its opposite ends in communication with inlet ports 13 and exhaust ports 14, the former being connected to the source of fuel supply through the instrumentality of a manifold 15 having a reciprocating valve 16 therein for alternately supplying the combustion chambers, while the latter is provided with an exhaust manifold 17 for obvious reasons.

Within the cylinder is a reciprocating piston 18 having a piston rod 19 extending through a packing gland 20 in one end of the cylinder and is connected to a crosshead 21 carrying racks 22 at its opposite ends, one of which is connected to the aforesaid valve 16 to alternately open and close the inlet ports and thus permit the injection of fuel into the combustion chambers at the proper time.

Preferably adjacent the crosshead 21 is a similar crosshead 23 having its opposite ends connected to reciprocating rods 24 carrying spur gears 25 which are retained in mesh with the racks 22 through the provision of racks 26 contacting with the opposite sides thereof and forming guides therefor.

The last mentioned crosshead is connected to the crank 9 through the instrumentality of a connecting rod 27 to impart rotary motion to the axles as the crossheads reciprocate.

Communicating with the inlet manifold of the motor is a supply tank 28 which is adapted to contain gaseous fuel or air under pressure and it will be observed that the successful operation of the motor is not dependent upon the storage of gaseous fuel.

As an auxiliary to the supply tank an air compressor 29, as shown in my Patent No. 1,389,089 is connected with the tank and is operated through the instrumentality of suitable gearing 30 connected to one of the driving axles as at 31. This compressor is of such construction that the maximum supply of air will be delivered to the fuel supply tank with the minimum resistance to the propulsion of the vehicle and, when the same is utilized to charge the tank with compressed air, only to operate the motor, the same will automatically maintain an even pressure in the tank and operate freely when a full head of pressure is stored in the tank.

In conjunction with the motor, an ignition system 32 is provided and, among the many auxiliaries thereto, includes a magneto 33 and spark plugs 34.

To eliminate accidental backward movement of the vehicle should it be stopped or stalled on a hill or grade, the axle housing H is provided with a brake B which consists of a dog 35 disposed to cooperate with a ratchet wheel 36 carried by the axle and adapted to be released by suitable means 37 under the control of the operator.

With this embodiment of elements assembled in cooperative relation on a vehicle, it will be noted that the liquid gaseous fuel within the tank will be compressed sufficiently to cause it to pass through the intake valve into the combustion chambers of the motor at the proper time, whereupon the ignition system will cause it to explode at the proper time driving the piston on its working strokes. During the reciprocating motion of the piston, the first mentioned crosshead will manipulate the second mentioned crosshead, through the instrumentality of the gear and rack connections therebetween, whereupon power will be transmitted to the driving axles through the provision of the connecting link between the second mentioned cross-head and crank connecting the opposed ends of the rear axles. With motion thus imparted to the driving axles the compressor will continue to operate to maintain pressure within the fuel supply tank and, where compressed air is utilized for driving the piston, instead of the expansive force of ignited gaseous fuel, the compressor will charge the tank with sufficient air to propel the vehicle as aforesaid.

The tank 28, during operation of the engine by gasoline, is so connected to the compressor that, as the gasoline is used up, the tank is filled with compressed air so that the engine will run even after all gasoline is exhausted. The gears 25 and racks 22 serve to regulate the movement of cross head 23 in such manner that it moves but one half the stroke of the piston.

This invention while being primarily disclosed as a motor vehicle can readily be utilized for supplying compressed air to storage tanks from which it is utilized for numerous purposes, especially since the compressor can be operated with the vehicle standing still.

With this invention fully described it is manifest that a motor vehicle is provided which is capable of producing the maximum of power with the minimum consumption of fuel and, through the particular arrangement of elements involved in its construction, the range of utility extends into numerous industries.

Having thus described my invention, what I claim and desire to protect by Letters Patent is:

A wheeled road vehicle of the character set forth comprising driving axles, a crank, clutches connecting the crank to the inner opposed ends of the axles, a motor, a reciprocating piston therein, a piston rod carried by the piston and projecting through one head of the motor, a crosshead connected to the outer end of the piston rod, racks on the opposite ends of the crosshead, movable spur gears meshing with the racks, other racks meshing with the spur gears from diametrically opposite points, a second cross-head, rods connecting the spur gears and second mentioned crosshead, a link connecting the second mentioned crosshead with the crank of the driving axles, a mitre-gear on one of the driving axles, a reciprocating compressor, a mitre-gear carried by the compressor for engagement with the mitre-gear on the driving axle, transmitting means between the compressor and mitre-gear thereof, a fuel storage tank in communication with the compressor, a reciprocating valve connected to the first mentioned crosshead and disposed between the fuel storage tank and motor to admit fuel into the combustion chambers of the motor, and clutches between the driving axles and wheels.

In testimony whereof I affix my signature.

MARSHALL A. ESTES.